No. 639,827. Patented Dec. 26, 1899.
A. ROCKENBAUGH & D. J. MILLER.
AUTOMATIC WINDMILL REGULATOR.
(Application filed Mar. 7, 1899.)
(No Model.) 2 Sheets—Sheet 1.
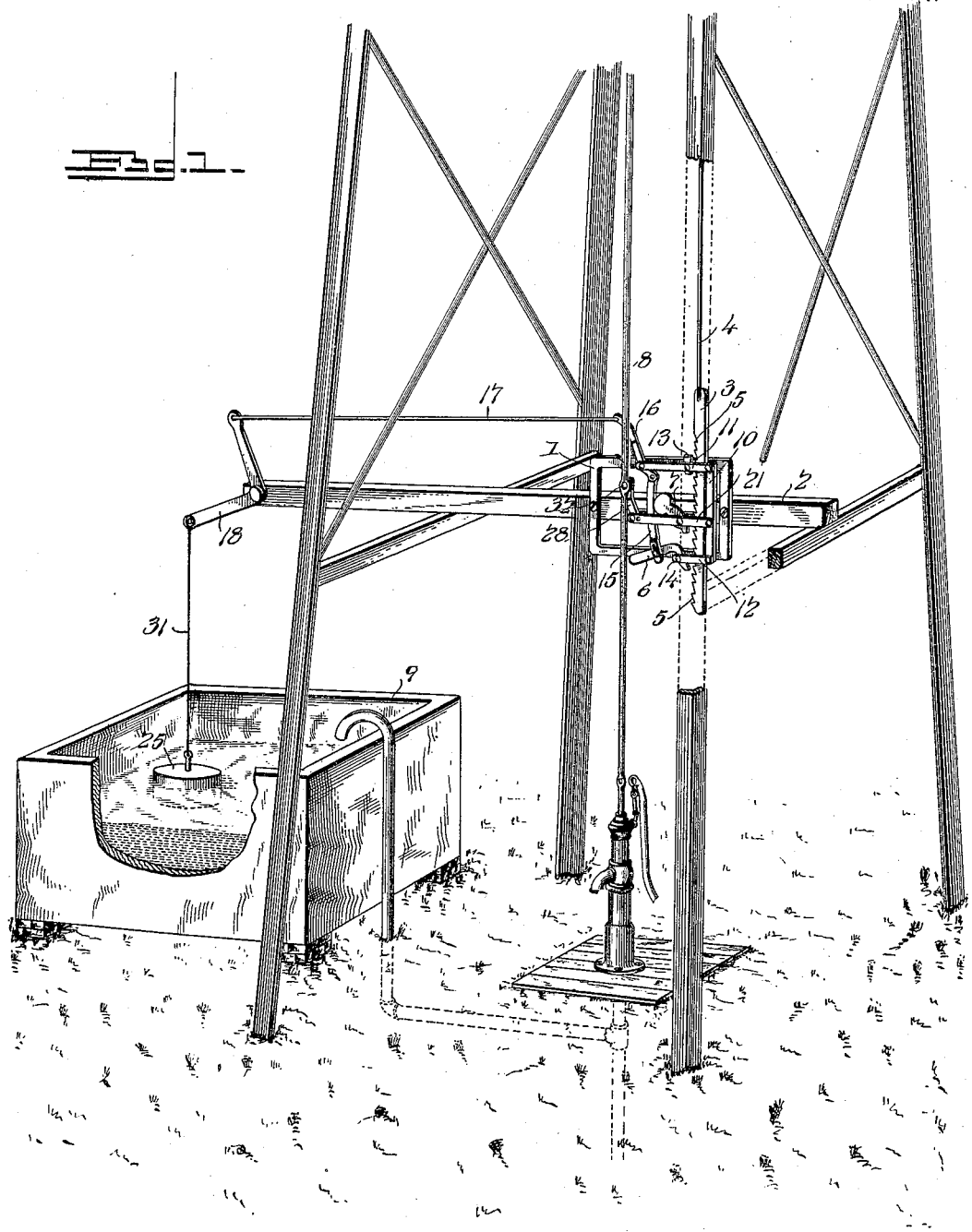

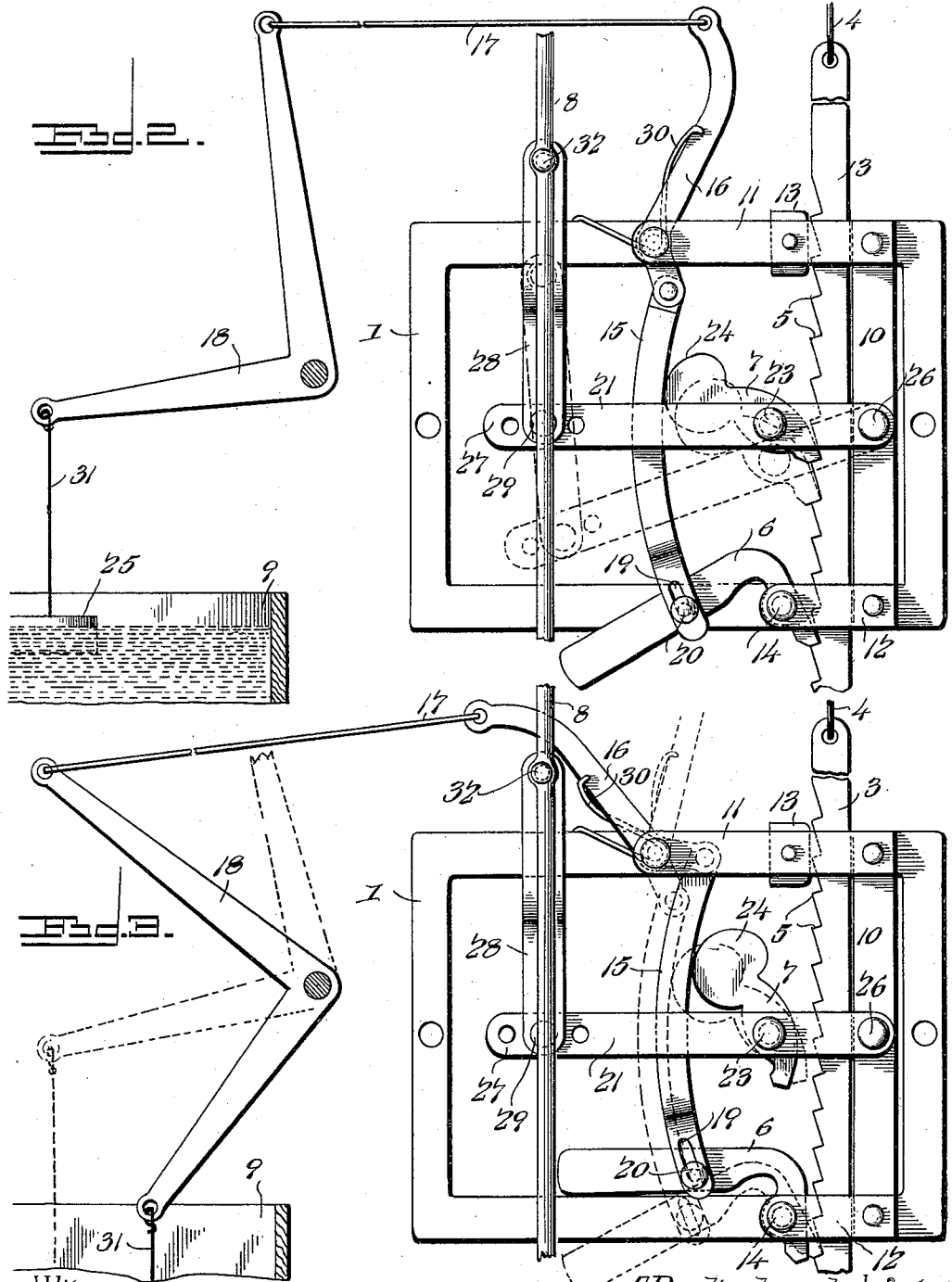

UNITED STATES PATENT OFFICE.

ADAM ROCKENBAUGH AND DANIEL J. MILLER, OF MILLERSBURG, INDIANA.

AUTOMATIC WINDMILL-REGULATOR.

SPECIFICATION forming part of Letters Patent No. 639,827, dated December 26, 1899.

Application filed March 7, 1899. Serial No. 708,125. (No model.)

*To all whom it may concern:*

Be it known that we, ADAM ROCKENBAUGH and DANIEL J. MILLER, citizens of the United States, residing at Millersburg, in the county of Elkhart and State of Indiana, have invented a new and useful Automatic Windmill-Regulator, of which the following is a specification.

The invention relates to improvements in automatic windmill-regulators.

The object of the present invention is to improve the construction of automatic windmill-regulators and to provide a simple, inexpensive, and efficient one adapted to throw a windmill gradually out of the wind without straining the parts of the windmill.

The invention consists in the construction and novel combination and arrangement of parts hereinafter fully described, illustrated in the accompanying drawings, and pointed out in the claims hereto appended.

In the drawings, Figure 1 is a perspective view of a windmill-regulator constructed in accordance with this invention and shown applied to the tower and pump-rod of a windmill. Fig. 2 is an enlarged elevation of the regulator, showing the pawls or dogs in engagement with the ratchet-bar. Fig. 3 is a similar view, the pawls or dogs being out of engagement with the ratchet-bar.

Like numerals of reference designate corresponding parts in all the figures of the drawings.

1 designates a rectangular supporting-frame mounted on a horizontal beam 2 of a windmill-tower and provided with suitable guides for a vertically-movable ratchet-bar 3, connected at its upper end to the operating-wire 4 of a windmill and provided at its inner edge with teeth 5 and adapted to be engaged by a check pawl or dog 6 and an actuating pawl or dog 7, which is connected with and operated by a reciprocating pump-rod 8, whereby the ratchet-bar will be drawn downward gradually by the action of the pump-rod to throw the windmill out of the wind when the water within a tank or receptacle 9 has reached the desired elevation. The guides, which are arranged at the top and bottom of the rectangular frame, are formed by a vertical bar 10, upper and lower horizontal bars 11 and 12, and an upper spacing block or piece 13, which is interposed between the upper horizontal bar and the top bar of the frame; but the guides may be constructed in any other suitable manner.

The check pawl or dog 6, which is arranged at the bottom of the rectangular frame, is pivoted at the inner end of the bar 12 by a suitable fastening device 14 and is substantially L-shaped, the pivot 14 being located at a point between the ends of the shorter arm, which is adapted, as illustrated in Fig. 2 of the accompanying drawings, to engage the ratchet-bar. The longer arm of the check pawl or dog operates as a weight and is connected by a curved link-bar 15 with one end of a lever 16, fulcrumed near its lower end on the top of the rectangular supporting-frame and having its upper end connected by a rod 17 with one arm of a bell-crank lever 18. The lower end of the curved link is provided with a slot 19, in which is arranged a pivot 20 for connecting the link with the pawl or dog 6, and the slot permits the latter to have a limited oscillation independent of the link to enable the teeth of the ratchet-bar to pass it as the said ratchet-bar is moved downward by the operation of the actuating pawl or dog 7.

The actuating pawl or dog 7 is mounted on an oscillating lever 21, at a point between the ends thereof, by a bolt or other suitable fastening device 23, and its inner end 24, which is enlarged to form a weight, is rounded to provide a curved edge and is arranged to be engaged by the curved link-bar 15, whereby the actuating pawl or dog is carried to an engaging position, when the lever 16 is operated by the rise of a float 25, as hereinafter described. The lever 21, which is composed of two bars or members, is pivoted at its front end by a bolt 26 or other suitable fastening device to the vertical bar 10, and the actuating-dog is located in the space between the bars or members at a point between the ratchet-bar and the curved link-bar 15. The inner end 27 of the lever 21 is adjustably connected with the pump-rod 8 by a pitman 28, and it is provided with a series of perforations adapted to receive a bolt 29, whereby the stroke of the lever 21 may be varied to cause the dog 7 to engage the ratchet-bar properly. When the pawls or dogs are in their engaging positions, the reciprocation of the pump-rod will cause an oscillation of the lever 21 and the actuating dog or pawl 7, which will operate on the ratchet-bar and gradually move the same downward, thereby pulling on the operating-wire 4 and drawing the wind-wheel gradually out of the wind to stop the windmill without straining or jarring the parts.

The lower arm of the lever 16 is arranged at a slight angle to the upper arm, which is engaged by a spring 30, composed of a central coil and a pair of arms, the central coil being disposed on the pivot of the lever 16 and the arms engaging, respectively, the frame 1 and the lever, whereby the latter will be positively moved in the direction of the ratchet-bar as the float rises. The bell-crank lever 18, which is fulcrumed on one end of the horizontal beam 2, has its lower substantially horizontal arm connected with the float 25 by a wire 31, and as the water rises in the tank or receptacle 9 the upper arm of the lever 16 will be gradually moved in the direction of the ratchet-bar, thereby swinging its lower arm downward and rearward and permitting the check pawl or dog and the actuating pawl or dog to assume gradually their engaging positions. The lower check pawl or dog is first caused to engage the ratchet-bar by the comparatively direct downward movement of the link 15, and as the latter swings rearward as the float nears the limit of its upward movement the actuating-pawl will be brought into its engaging position, and the positions assumed by the parts of the device are clearly illustrated in full and dotted lines in Figs. 2 and 3 of the accompanying drawings. When the water lowers in the tank about six or seven inches, the falling of the float will disengage the pawls from the ratchet-bar and permit the windmill to operate. The upper end of the pitman 28 is connected with the reciprocating pump-rod by a bolt 32 or other suitable fastening device, and the said pitman is provided near its center with a bend which offsets its ends to enable them to be connected with the pump-rod and the lever 21, as these parts operate in different vertical planes.

The invention has the following advantages: The windmill-regulator, which is simple and comparatively inexpensive, is positive, reliable, and automatic in its operation, and it is adapted to draw the wind-wheel gradually out of the wind on the downstroke of the pump-rod, which equalizes the operation of the mill, and by gradually swinging the vane of a windmill from its position at right angles to the wind-wheel to a position parallel with the same throws the windmill out of operation without jerking or straining any of the parts and without subjecting the windmill-regulator to excessive strain. When the water rises in the tank or receptacle, the actuating and check pawls or dogs are drawn into their engaging position to stop the windmill, and when the water is consumed the pawls or dogs are disengaged from the ratchet-bar to release the same for starting the windmill. The operation of the device is gradual, and the pawls or dogs are not disengaged from the ratchet-bar until a predetermined amount of water has been consumed.

Changes in the form, proportion, size, and the minor details of construction within the scope of the appended claims may be resorted to without departing from the spirit or sacrificing any of the advantages of this invention.

What is claimed is—

1. A device of the class described comprising a ratchet-bar, a check-pawl, a link arranged approximately parallel with the ratchet-bar and connected with the check-pawl, an actuating-pawl arranged at a point between the ends of the link in position to be thrown out thereby, and a lever designed to be connected with a float and located at the upper end of the link and connected with and adapted to actuate the same to engage the actuating-pawl with and disengage it from the ratchet-bar, substantially as described.

2. A device of the class described comprising a vertically-movable ratchet-bar, a horizontal lever designed to be connected with the pump-rod, a check-pawl located beneath the lever, an actuating-pawl carried by the lever, a link disposed substantially vertically and having a slotted connection at its lower end with the check-pawl and engaging the actuating-pawl, and a lever connected with the upper end of the link and designed to be operated by a float, substantially as described.

3. A device of the class described comprising a vertical ratchet-bar, a horizontal lever designed to be connected with a pump-rod, an actuating-pawl pivoted between its ends on the lever and having an enlarged rounded rear end, a check-pawl located below the lever, a curved link connected with the check-pawl and engaging the rounded end of the actuating-pawl, and means for operating the link, substantially as described.

4. A device of the class described comprising a vertical ratchet-bar, a lever, an actuating-pawl fulcrumed between its ends on the lever, a check-pawl pivoted between its ends, a vertically-disposed link having a slotted connection at its lower end with the check-pawl and engaging the actuating-pawl, a lever 16 connected with the upper end of the link and designed to be operated by a float, and a spring engaging the lever 16, substantially as described.

5. A device of the class described comprising a vertically-movable ratchet-bar, a horizontal lever designed to be connected with a pump-rod, a check-pawl, a link disposed in substantially a vertical plane and connected at its lower end with the check-pawl, an actuating-pawl mounted on the lever and arranged at a point between the ends of the link in position to be thrown out thereby, a tank, a float, and a lever connected with the float and with the upper end of the link, substantially as described.

In testimony that we claim the foregoing as our own we have hereto affixed our signatures in the presence of two witnesses.

ADAM ROCKENBAUGH.
DANIEL J. MILLER.

Witnesses:
ALTA DENEY,
BENJAMIN F. DEAHL.